United States Patent [19]

King et al.

[11] Patent Number: 5,594,857
[45] Date of Patent: Jan. 14, 1997

[54] CONCEPTUAL MAP SHOWING THE WINDOWS OF A COMPLEX TASK

[75] Inventors: C. David King; Robert J. Torres, both of Colleyville, Tex.

[73] Assignee: IBM Corporation, Roanoke, Tex.

[21] Appl. No.: 610,797

[22] Filed: Mar. 4, 1996

Related U.S. Application Data

[63] Continuation of Ser. No. 989,122, Dec. 11, 1992, abandoned.

[51] Int. Cl.$^6$ .................................................... G06F 3/14
[52] U.S. Cl. ............................................ 395/352; 395/326
[58] Field of Search ................................. 395/155, 156, 395/157, 161

[56] References Cited

U.S. PATENT DOCUMENTS

| | | | |
|---|---|---|---|
| 4,821,211 | 4/1989 | Torres | 395/156 |
| 5,226,117 | 5/1990 | Miklos | 395/157 |
| 5,289,574 | 10/1990 | Sawyer | 395/157 |

OTHER PUBLICATIONS

Norton & Yao, Windows 3.0 Power Prgmming Techniques 1990, pp. 24–25, p. 389.

*Primary Examiner*—Mark K. Zimmerman
*Assistant Examiner*—Cliff N. Vo
*Attorney, Agent, or Firm*—William Lloyd Clayborn; John M. Cone

[57] ABSTRACT

A visual conceptual map is displayed on each window of a program for accomplishing a complex task. In the preferred embodiment, the conceptual map includes all of the program's action dialogs and the potential paths between the action dialogs. The action dialog corresponding to the current window, the action dialogs that can presently be selected from the current window, and the other action dialogs are visually distinguished from each other. In addition, the potential paths from the action dialog corresponding to the current window to the action dialogs that may presently be selected from the current window are visually distinguished from the other potential paths.

4 Claims, 4 Drawing Sheets

FIG. 1

*Calendar – Find Free Time*

Tuesday, November 19
1991

| Sun | Mon | Tue | Wed | Thu | Fri | Sat |
|---|---|---|---|---|---|---|
| | | | | | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

JAN | FEB | MAR | APR | MAY | JUN
JUL | AUG | SEP | OCT | NOV | DEC

NOTE:

2:00 pm
TODAY
WEEKLY
MONTHLY

MEETING SCHEDULER
Sally Baker

MEETING REQUESTER
Jim Stone

STARTING DATE
11-19-91

ENDING DATE
11-21-91

AMT OF TIME NEEDED
1:00

STARTING TIME
8:00

LOCATION
2310

ATTENDEE LIST
Bob Douglas
Dave Wood
Tom Smith     13

RESOURCES/EQUIPMENT LIST

1 — SELECT MEETING TIME    3 — ENTER MEETING DETAILS    5 — CANCEL

*Calendar – Select Meeting Time*

Free Time Found (☐) & Selection (☐) For a Meeting

FREE TIME FOUND (1) → FREE TIME FOUND (2) → FREE TIME FOUND (3)

| | 11/19/91 TUE | 11/20/91 WED | 11/21/91 THU |
|---|---|---|---|
| 8:00 | | | |
| 9:00 | | | |
| 10:00 | | | |
| 11:00 | | | |
| 12:00 | | | |
| 1:00 | | | |
| 2:00 | | | |
| 3:00 | | | |
| 4:00 | | | |
| 5:00 | | | |
| 6:00 | | | |

7 — FIND FREE TIME    9 — CHECK CONFLICTING SCHEDULE    3 — ENTER MEETING DETAILS    5 — CANCEL

CONCEPTUAL MAP SHOWING THE WINDOWS OF A COMPLEX TASK

This application is a continuation of application Ser. No. 07/989,122, filed Dec. 11, 1992, now abandoned.

BACKGROUND OF THE INVENTION

The present invention relates to computer applications programs. More particularly, the present invention relates to programs in which a computer user interacts with several display screens or windows in order to accomplish a complex task.

In order to accomplish the steps of a complex task, the computer user is required to enter data and/or make selections on several windows. Thus, to accomplish the task, the user must move from one window to another.

To move from a currently-displayed window (the "current window") to another, desired window, the user selects an "action dialog" corresponding to the desired window. Conventionally, such an action dialog is shown on the current window as a rectangle in which the title of the corresponding window is printed. A program may also include action dialogs that the user may select to perform actions other than moving from one window to another, in which case a particular action's action dialog is shown as a rectangle in which a description of the action is printed. A particular window's or action's action dialog may be selected by conventional means, such as a mouse.

In the prior art, only the actions which can be selected from the current window are displayed on the current window. That is, if the user cannot move to a particular window from the current window, the action dialog for that window is not shown on the current window. In like manner, if the user may not select a particular action from the current window, that action's action dialog is not shown on the current window. As a result, because all of the window's and action's action dialogs are not shown on all of the program's windows, the user may be confused as to how to proceed in order to accomplish the desired task.

An example of a complex task which requires several windows is a meeting-scheduling program, which is a subprogram of a calendar program. Such programs are well-known in the art.

FIGS. 1–4 show the windows for a known meeting-scheduling program: a Find Free Time window (FIG. 1), a Select Meeting Time window (FIG. 2), a Check Conflicting Schedule window (FIG. 3), and a Enter Meeting Details window (FIG. 4). Also shown in FIGS. 1–4 are the program's action dialogs: Select Meeting Time 1, Enter Meeting Details 3, Cancel 5, Find Free Time 7, Check Conflicting Schedule 9, and Send A Meeting Notice 11. As the present invention is related to the manner in which action dialogs are displayed on a program's windows, only the functions of the meeting-scheduling program's action dialogs and the prior art display of those action dialogs will be discussed.

When the meeting-scheduling program first begins operating, the Find Free Time window (FIG. 1) is the current window. From the Find Free Time Window, the user can move to the Select Meeting Time window (FIG. 2) by selecting the Select Meeting Time window action dialog 1. The user can also move to the Enter Meeting Details window (FIG. 3) by selecting the Enter Meeting Details window action dialog 3. Finally, the user can terminate the meeting-scheduling program and return to the main calendar program by selecting the Cancel action dialog 5.

When the Select Meeting Time window (FIG. 2) is the current window, the user can move to the Find Free Time window (FIG. 1) by selecting the Find Free Time action dialog 7, to the Check Conflicting Schedule window (FIG. 3) by selecting the Check Conflicting Schedule action dialog 9, or to the Enter Meeting Details window (FIG. 4) by selecting the Enter Meeting Details action dialog 3. In addition, the user can terminate the task and return to the main calendar program by selecting the Cancel action dialog 5.

The functions of the Select Meeting Time action dialog 1, the Enter Meeting Details action dialog 3, the Cancel action dialog 5 shown in FIGS. 3 and 4 are the same as described above. The Send A Meeting Notice action dialog 11 shown on the Enter Meeting Details window (FIG. 4) is selected to send the details of the scheduled meeting to the attendees listed on the Attendee List 13.

With the exception of the Select Meeting Time window (FIG. 2), the windows of the program do not provide an indication of the titles of all the program's other windows. Further, only the Enter Meeting Details window (FIG. 4) displays the Send A Meeting Notice action dialog 11. Thus, the program's user is not shown an complete picture of the program's action dialogs on each window, which could cause confusion, especially for a user who is not familiar with the program.

The steps required to perform the task of the meeting-scheduling program of the example are relatively straightforward. In a program whose steps are less straightforward, displaying only the action dialogs that can be selected from the current window increases the possibility of confusion and error.

SUMMARY OF THE INVENTION

According to the present invention, a visual conceptual map is displayed on each window of a program for performing a complex task. In the preferred embodiment, the conceptual map for each window includes all the program's action dialogs that correspond to the program's windows and all the action dialogs that may be selected from that window at some time during the operation. Preferably, the conceptual map for each window includes all of the program's action dialogs.

On each of the program's windows, the action dialog that corresponds to the current window, the action dialogs that can presently be selected from the current window, and the action dialogs that cannot presently be selected from the current window are visually distinguished from each other.

The conceptual map also includes a plurality of potential paths. Each potential path connects an action dialog that corresponds to a window to an action dialog that may be selected from that window at some time during the operation of the program. On each window, the potential paths between the action dialog that corresponds to the current window and the action dialogs that can presently be selected from the current window are visually distinguished from the other potential paths.

One of the program's action dialogs allows the user to terminate the program from any window and, if applicable, return to a larger program of which the complex task is a subprogram. In addition, when the action dialog for the final step in the program's task is selected and that step is completed, the program is terminated and, if applicable, returned to a larger program.

BRIEF DESCRIPTION OF THE DRAWINGS

An embodiment of the invention will be described, by way of example only, with reference to the accompanying drawings, in which:

FIG. 1 is the Find Free Time window of a meeting-scheduling program having a prior art action dialog display;

FIG. 2 is the Select Meeting Time window of the program of FIG. 1;

DETAILED DESCRIPTION

Figure 4:
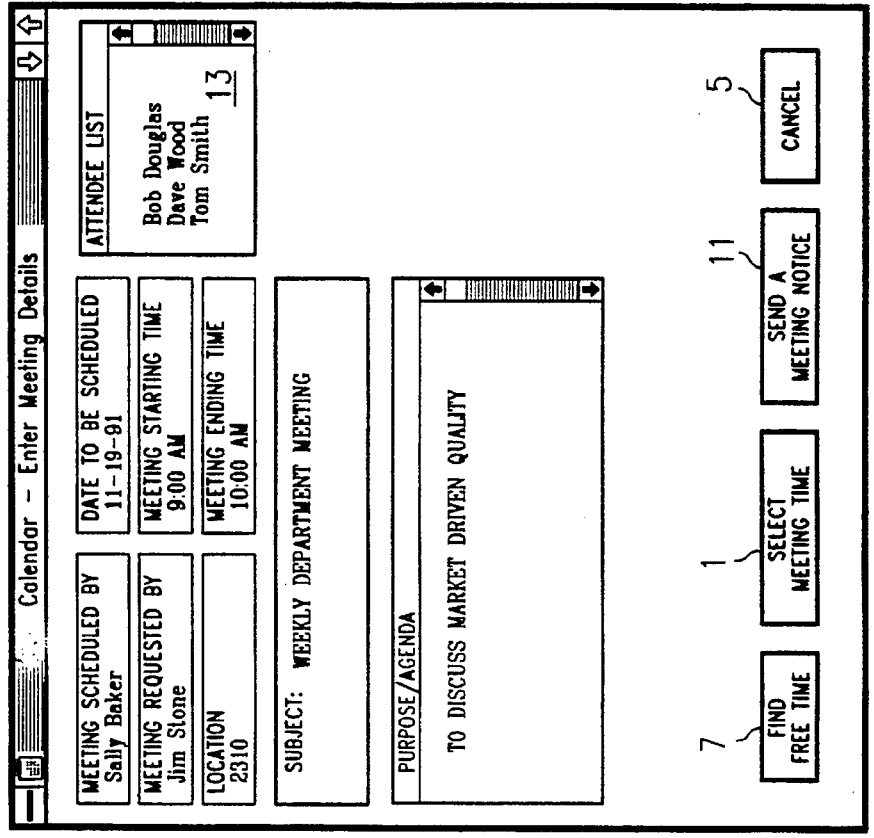
FIG. 4 is the Enter Meeting Details window of the program of FIG. 1.
Figure 3:
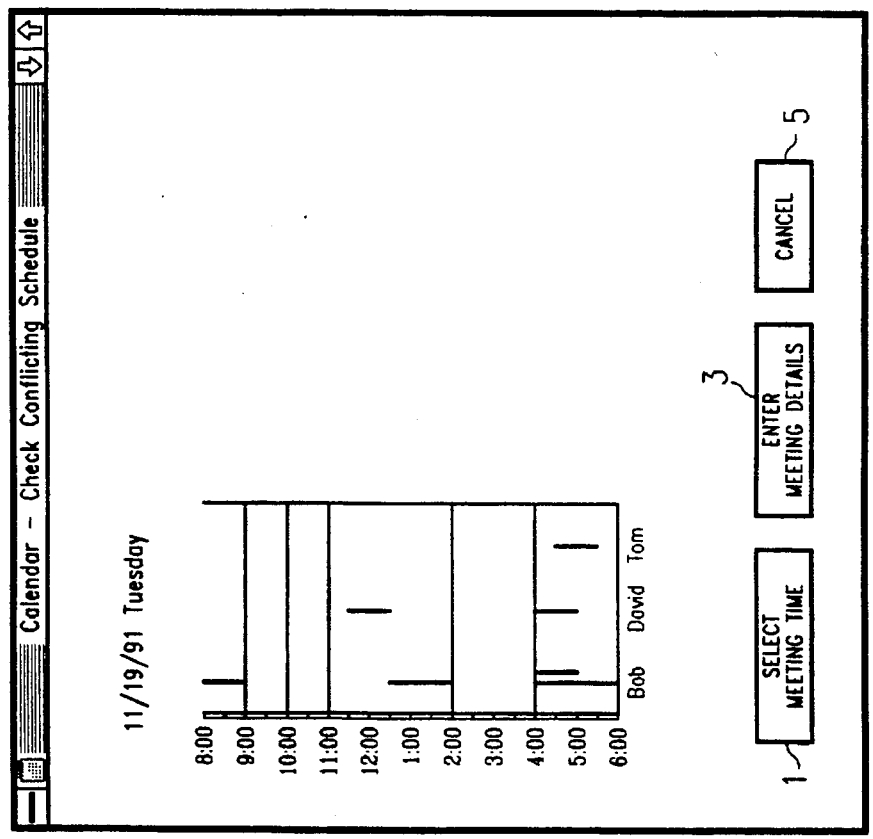
FIG. 3 is the Check Conflicting Schedule window of the program of FIG. 1.
Figure 5:
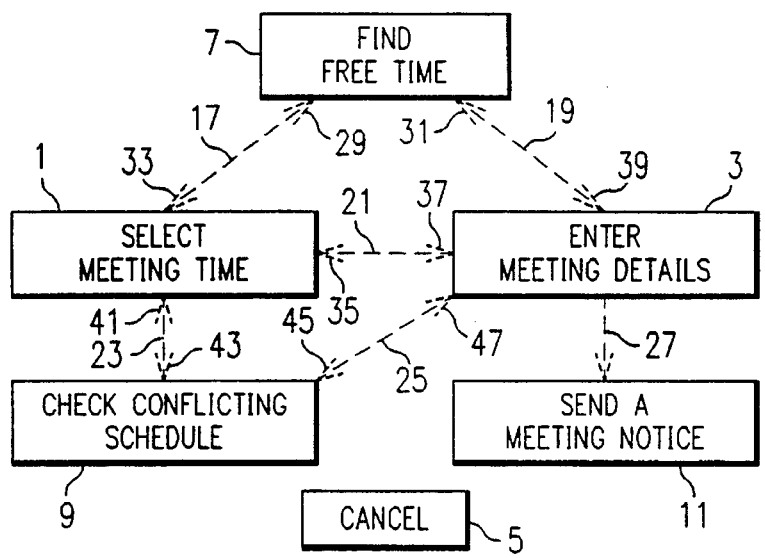
FIG. 5 is a conceptual map constructed in accordance with the present invention from the action dialogs shown in FIGS. 1-4.

FIG. 5 shows an visual conceptual map 15 assembled in accordance with the present invention from the action dialogs shown in FIGS. 1-4. The conceptual map 15 may be used to replace each of the action dialog displays shown in FIGS. 1-4. However, in the preferred embodiment of the invention, a different version of the conceptual map 15 is constructed for each of the program's windows. As described below, each window's conceptual map provides visual cues indicating the window that is the current window and the action dialogs that can be selected from the current window.

The dotted arrows 17-27 on the conceptual map 15 indicate all the potential paths between the action dialogs. For example, the double-headed arrow 19 between the Find Free Time action dialog 1 and the Enter Meeting Details action dialog 3 indicates that the user can move back and forth between the windows that correspond to those action dialogs. That is, when the current window is the Find Free Time window (FIG. 1), the user may move to the Enter Meeting Details window (FIG. 4) by selecting the Enter Meeting Details action dialog 3; and when the current window is the Enter Meeting Details window (FIG. 4), the user may move to the Find Free Time window (FIG. 1) by selecting the Find Free Time action dialog 1. In like manner, the double-headed arrows 17 and 21-25, respectively, indicate that by selecting the appropriate action dialog, the user may move between the Find Free Time and select Meeting Time windows (FIGS. 1 and 2), between the Select Meeting Time and Enter Meeting Details windows (FIGS. 2 and 4), between the Select Meeting Time and Check Conflicting Schedule windows (FIGS. 2 and 3), and between the Check Conflicting Schedule and Enter Meeting Details windows (FIGS. 2 and 4). The single-headed arrow 27 indicates that the user may select the Send A Meeting Notice action dialog 11 only when the current window is the Enter Meeting Details window (FIG. 4). Thus, the conceptual map 15 provides the user a visual indication of the functional relationship of all the program's action dialogs.

In the preferred embodiment, the action dialog that corresponds to the current window is visually distinguished from the other action dialogs. Also, the action dialogs that can be selected from the current window are visually distinguished from the current window's action dialog and from the action dialogs that cannot be selected from the current window. As this embodiment is intended for a computer having a color monitor, the various action dialogs are distinguished by different colors. Thus, three different colors are used: one color for the current window's action dialog, a second color for the action dialogs that can be selected from the current window, and a third color for the action dialogs that cannot be selected from the current window. For a monochrome monitor, three different shadings may be used to distinguish the various action dialogs. The distinctions between the various action dialogs provide visual cues that indicate to the user the current window and the action dialogs that can and cannot be selected from the current window.

Figure 6:
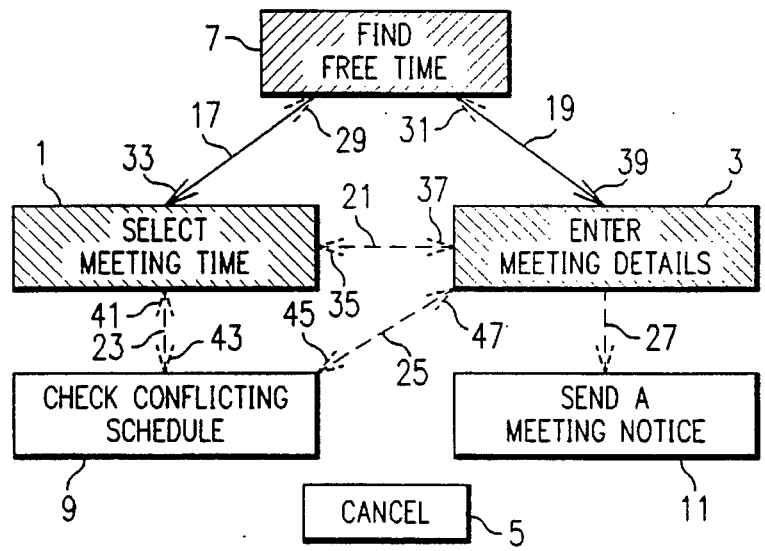
FIG. 6 is the version of the conceptual map of FIG. 5 for the window of FIG. 1.
Figure 7:
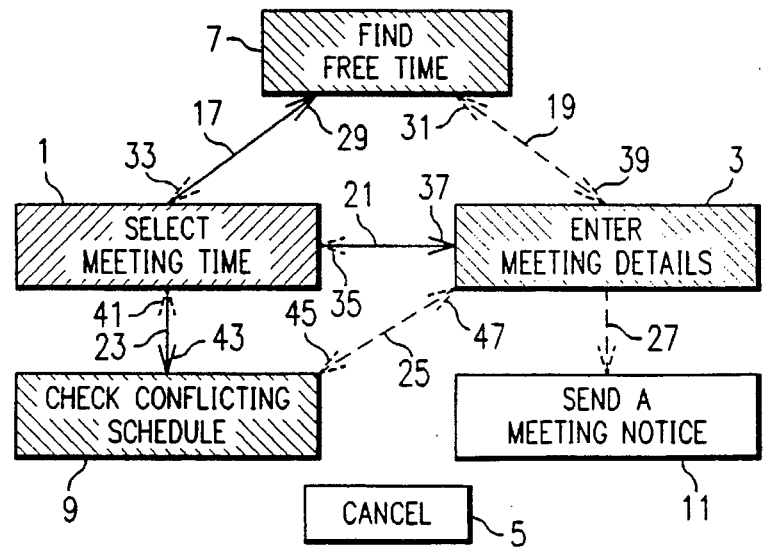
FIG. 7 is the version of the conceptual map of FIG. 5 for the window of FIG. 2.
Figure 8:
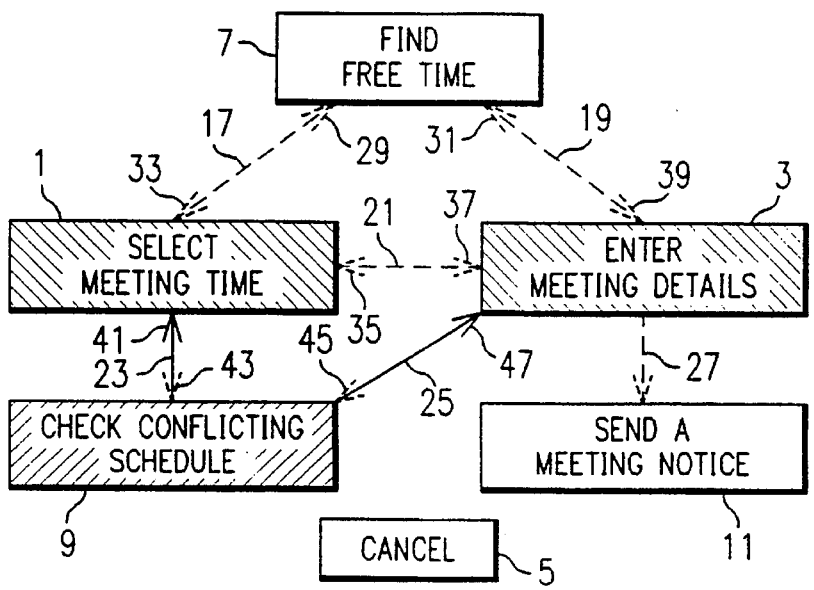
FIG. 8 is the version of the conceptual map of FIG. 5 for the window of FIG. 3.
Figure 9:
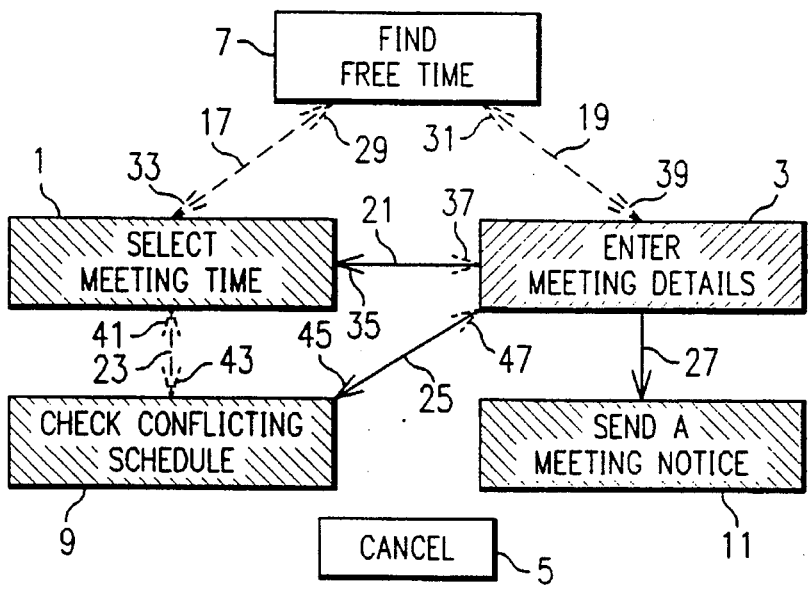
FIG. 9 is the version of the conceptual map of FIG. 5 for the window of FIG. 4.

To provide an additional visual cue for the user, the arrows from the action dialog that corresponds to the current window to the action dialogs that can be selected from the current window are visually distinguished from the other arrows. For example, as shown in FIG. 6, on the conceptual map 49 for the Find Free Time window of FIG. 1, the shafts of arrows 17 and 19 are solid, as are the arrow's heads 33 and 39 nearest to the Select Meeting Time and Enter Meeting Detail action dialogs 1 and 3. FIGS. 7-9 show the conceptual maps 51-55 for the Select Meeting Time, Check Conflicting Schedule, and Enter Meeting Details windows of FIGS. 2-4, respectively. As can be seen in FIGS. 6-9, on each of the conceptual maps 49-55, there are solid arrows pointing from the action dialog corresponding to the current window to the action dialogs that can be selected from the current window, while the other arrow shafts and arrow heads are dotted.

The Cancel action dialog 5 may be selected from any window. However, to avoid clutter, the conceptual maps 49-55 do not show the potential paths from the action dialogs that correspond to windows to the Cancel action dialog 5.

As described above in connection with the prior art action dialog display, when the Cancel action dialog 5 is selected, the complex task program is terminated and the program returns to the main calendar program. Similarly, when the Send A Meeting Notice action dialog 11 is selected, the selected action is performed, the complex task program is terminated, and the program returns to the main calendar program.

Essentially, the conceptual maps 15 and 49-55 show the user "the big picture" regarding the program's action dialogs. Further, due to the distinctions between the action dialogs and arrows on the conceptual maps 49-55, the user is provided visual indications of the user's position on the conceptual maps 59-55, where the user can go from that position, and what the user can do in that position. Thus, the present invention provides a display that assists the user interact with a program to perform a complex task without confusion or error.

In this embodiment of the invention, only one window is displayed at a time. However, it will be obvious to one skilled in the art that the present invention is equally applicable to programs which display more than one window at a time. Further, while the conceptual maps 15 and 49-55 of this embodiment include all of the meeting-scheduling program's action dialogs, it is to be understood that the action dialogs of other complex-task programs may be too numerous to be conveniently included on a conceptual map. In that case, each window's conceptual map includes at least all of the program's action dialogs that correspond to windows and other action dialogs that may be selected from that window.

In the described embodiment, the conceptual maps 49–55 for the program's windows (FIGS. 1–4) do not change as the user performs the steps of the program. In another version (not shown) of the described meeting-scheduling program, when the user has entered the data required to send a meeting notice, the Send A Meeting Notice action dialog may be selected from any window. An embodiment of the present invention for that version of the meeting-scheduling program includes a dotted, single-headed arrow from the action dialogs for each window to the Send A Meeting Notice action dialog. After the user has entered the data required to send a meeting notice, the arrow from the current window's action dialog to the Send A Meeting Notice Dialog changes from dotted to solid, and the Send A Meeting Notice action dialog changes to the color which indicates the action dialogs that can be selected from the current window. Thus, the present invention is applicable to complex-task programs in which the functional relationships of the action dialogs change while the user interacts with the program.

While a preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A method for visually assisting a computer user to move between a plurality of related windows to perform a task, comprising the steps of:
   a. displaying any one of said related windows on a computer display screen; and
   b. generating and displaying in said displayed window a conceptual map including:
      I. a plurality of action dialogs one of which corresponds to each of said related windows; and
      II. a plurality of potential paths extending between said action dialogs, said potential paths graphically indicating which of said related windows are selectable from each related window.

2. The method of claim 1, wherein, in step (b), the action dialog corresponding to the displayed window is visually distinguished from the other action dialogs.

3. The method of claim 2, wherein, in step (b), the action dialogs corresponding to related windows that are selectable from the displayed window are visually distinguished from the action dialog corresponding to the displayed window and from the action dialogs corresponding to related windows that are not selectable from the displayed window.

4. The method of claim 1, wherein, in step (b), the potential paths extending between the action dialog corresponding to the displayed window and the action dialogs corresponding to the related windows that are selectable from the displayed window are visually distinguished from the other potential paths.

* * * * *